Feb. 11, 1969     R. S. ORDWAY     3,426,973
APPARATUS FOR APPLYING A FLUENT TO AN OBJECT
TRAVELLING ON A CONVEYOR
Filed May 22, 1967

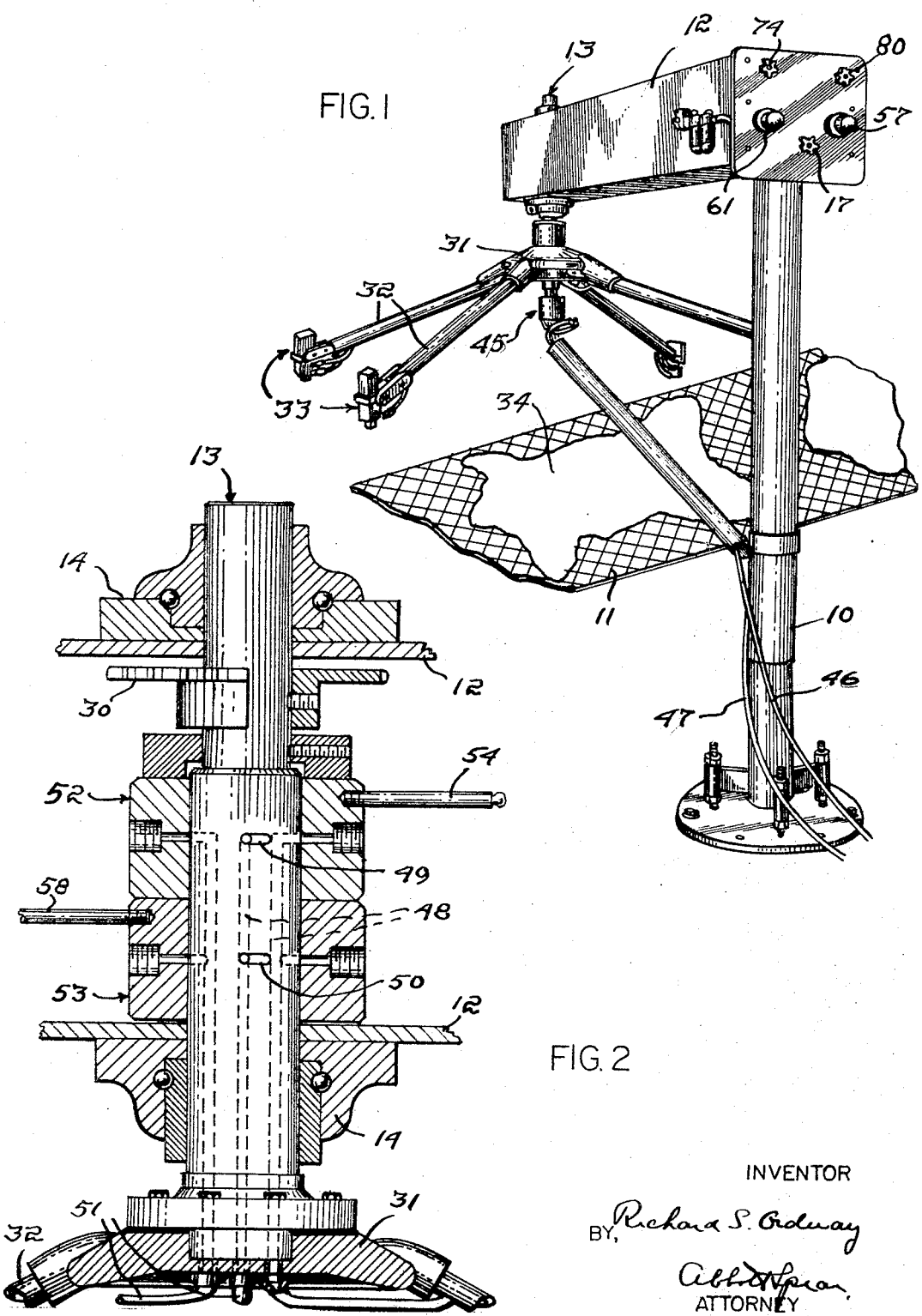

INVENTOR
Richard S. Ordway
BY
ATTORNEY

United States Patent Office 3,426,973
Patented Feb. 11, 1969

3,426,973
APPARATUS FOR APPLYING A FLUENT TO AN OBJECT TRAVELLING ON A CONVEYOR
Richard S. Ordway, Haverhill, Mass., assignor to George O. Comeau, Haverhill, Mass.
Filed May 22, 1967, Ser. No. 640,196
U.S. Cl. 239—66          9 Claims
Int. Cl. B05b 3/02, 5/00, 9/00

ABSTRACT OF THE DISCLOSURE

Apparatus having a shaft depending over a conveyor and provided with equally spaced arms, each with an air operated spray device, operating air being delivered successively to each device lengthwise of the shaft as the shaft turns to position it over the conveyor, and the apparatus having orifices that are adjustable to vary the interval the air is so delivered thus to vary the sprayed area.

---

Figure 3:
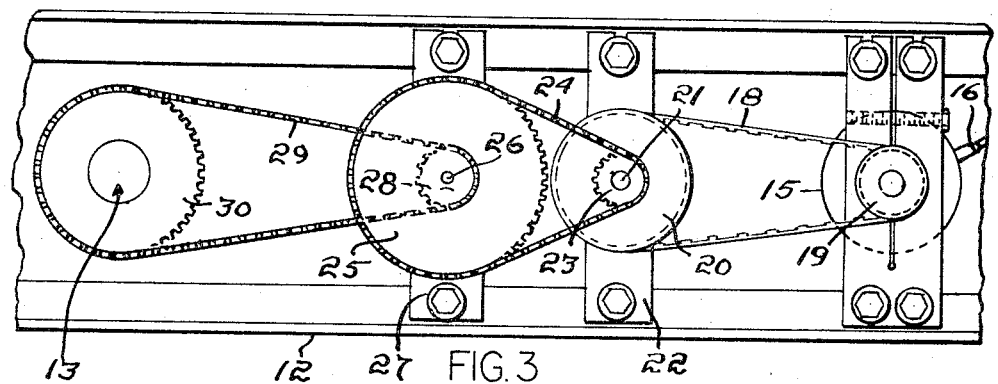

A number of variable factors are involved in the treatment of conveyed articles, the spray treatment of hides with a dye, for example. While a spray must be effectively applied, it should be applied without undue waste. Variable factors include the size of the hides and the particular fluent to be applied thereto. For that reason, apparatus is used consisting of a rotatable shaft provided with equally spaced, outwardly extending arms. Each arm has a spray device which is operated when it is over the conveyor.

The general objective of the present invention is to provide such apparatus with adjustable control of the spray in terms of the arcuate travel of the arms, desirably in terms of both the spray area and in terms of its location relative to the width of the conveyor.

Another objective of the present invention is to effect such adjustable control by utilizing spray devices that have their control valves air-operated with the conduits to such valves including portions extending lengthwise of the shaft with each such conduit portion having an upper and a lower port opening through the periphery of the shaft. The upper series of ports is closed by an upper ring and the lower series of ports is closed by a lower ring. At least one of the rings is rotatable relative to the shaft and to the other and each has a port in communication with a source of air under pressure and adapted to coact with a port of the appropriate series to deliver a valve-operating air stream to an appropriate valve as the shaft turns. Either the ports of the rings or the ports of the shaft are elongated in a direction transversely of the shaft axis thereby enabling the valve operating air to be delivered through an arc of variable length, the range being of the extent of the overlap between two vertically related elongated ports.

In the accompanying drawings there is shown an illustrative embodiment of the invention from which these and other of its objectives, novel features, and advantages will be readily apparent.

Figure 4:
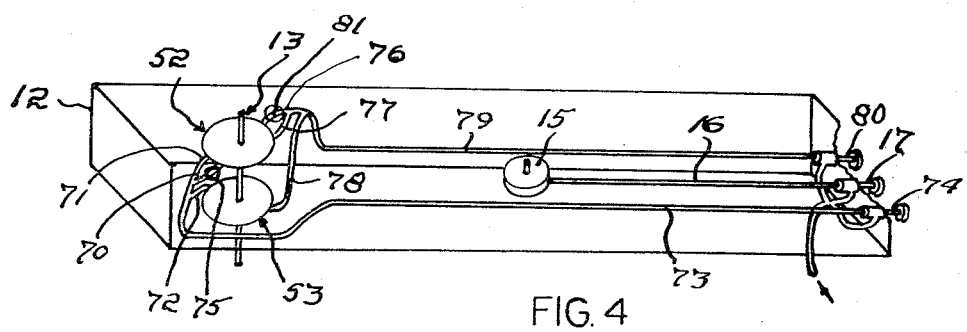
Figure 5:
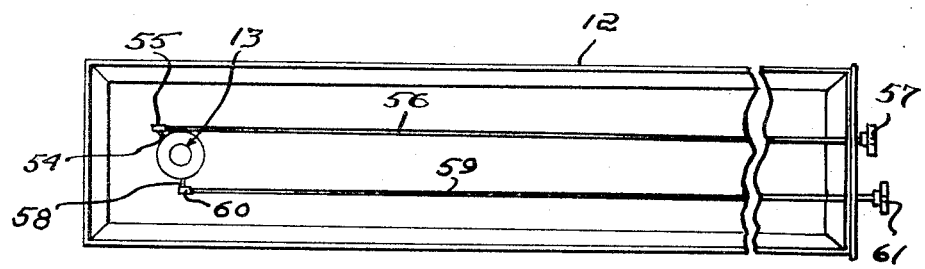
Figure 6:
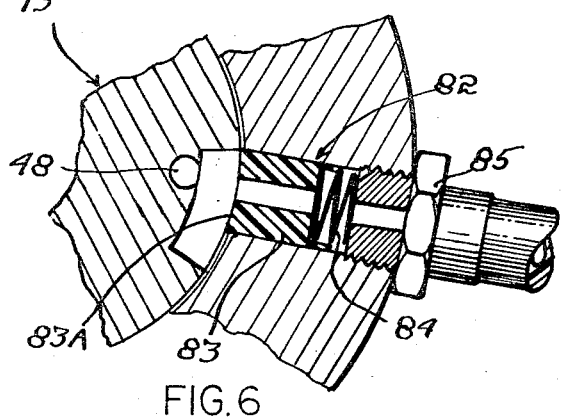
Figure 7:
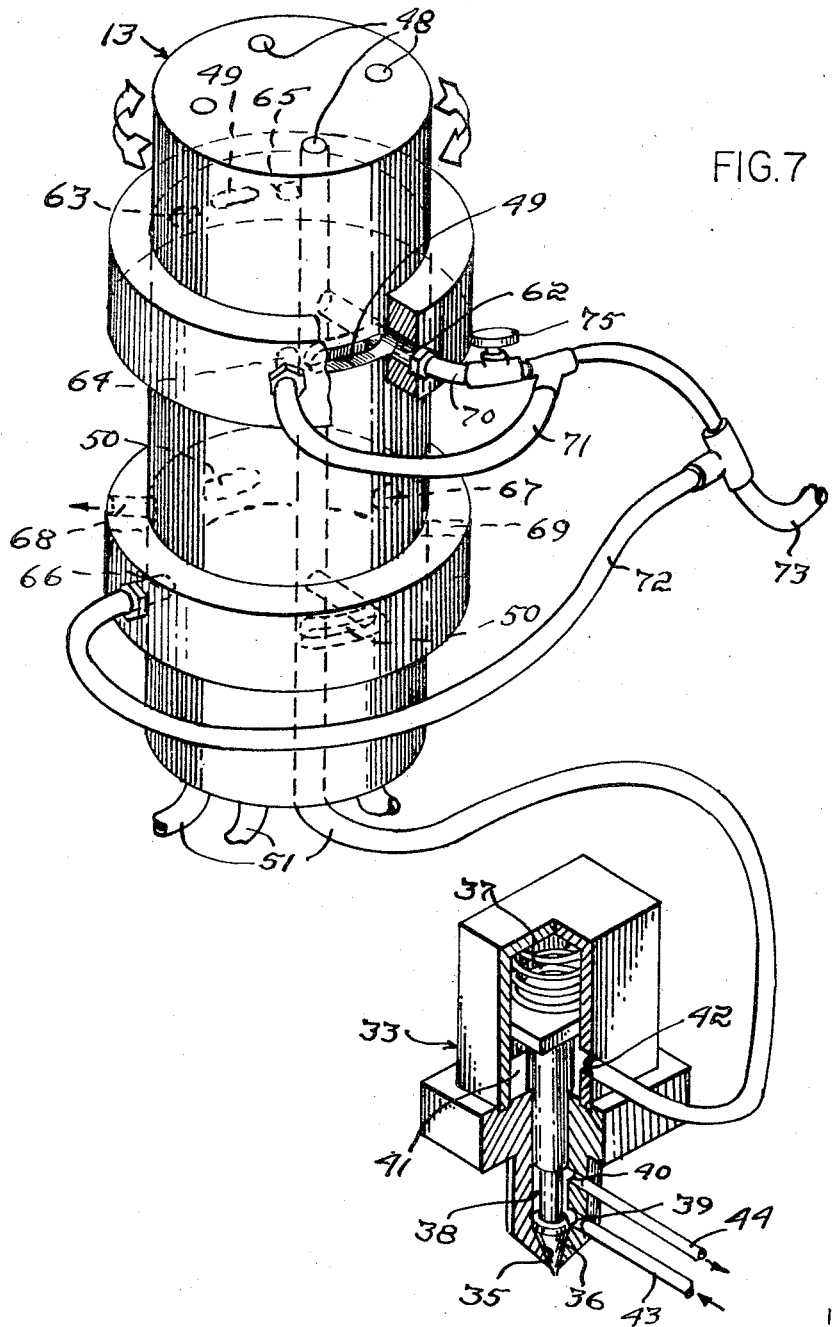
Figure 8:
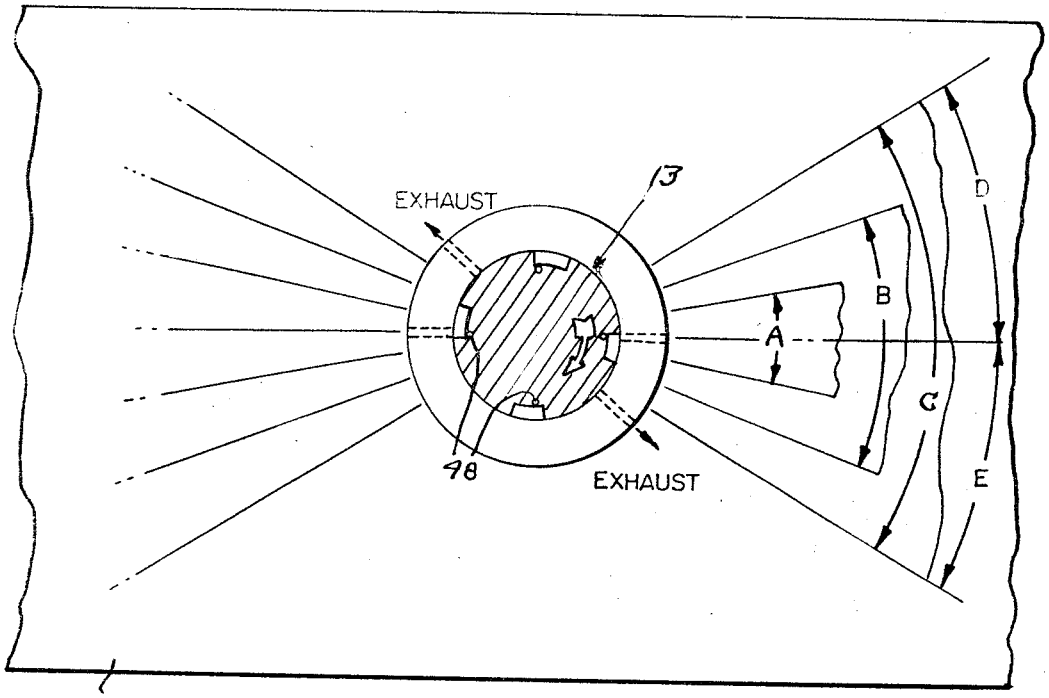
Figure 9:
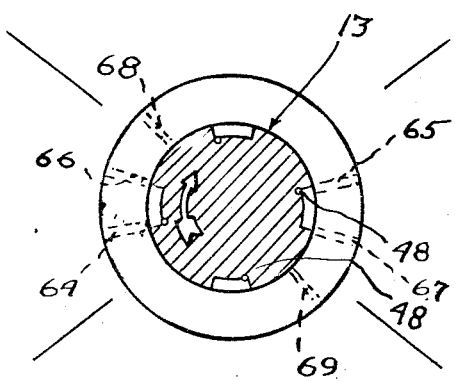

In the drawings:

FIGURE 1 is a perspective view of apparatus in accordance with the invention,

FIGURE 2 is a vertical section through the control rings exposing the shaft, its two series of arcuate slots and lengthwise passages, FIGURE 3 is a fragmentary section lengthwise of the housing showing the shaft drive, FIGURE 4 is a somewhat schematic perspective showing the air conduits in the housing and their control valves, FIGURE 5 is a fragmentary section lengthwise of the housing showing the ring adjusting means, FIGURE 6 is a fragmentary section, on an increased scale, of the shaft and one of the rings illustrating an air inlet, FIGURE 7 is a somewhat schematic view illustrating the operation of the apparatus, FIGURE 8 is a like view illustrating the effect of ring adjustments on delivery patterns, and FIGURE 9 is a schematic view illustrating the relationship of the coacting ports in effecting spray adjustments.

In FIGURE 1, the apparatus is shown as consisting of a stand 10 at one side of a conveyor 11 and provided, at its upper end, with a support in the form of a housing 12 extending transversely over the conveyor. A depending shaft, generally indicated at 13, is supported by bearings 14 mounted on the top and bottom of the housing.

The drive for the shaft 13 includes a generally indicated air motor 15, see FIGURE 3, the air inlet 16 to which is controlled by a valve, see FIGURE 4, adjustable to provide the desired shaft speed and mounted at the inner end of the housing 12 to be readily accessible to the operator.

A belt 18 connects the drive pulley 19 of the motor 15 to the pulley 20 mounted on a shaft 21 carried by a support 22 in the housing 12 and provided with a sprocket 23. The sprocket 23 is connected by a chain 24 to a sprocket 25 mounted on a shaft 26 carried by a support 27 and having a smaller sprocket 28 connected by a chain 29 to a sprocket 30 fastened on the shaft 13.

A head 31 is attached to the lower end of the shaft 13. The head 31 supports equally spaced, radial, hollow arms 32 to the outer ends of which are secured discharge devices or guns, generally indicated at 33 for the delivery of a dye spray, for example, on hides 34 carried on the conveyor 11 under the apparatus.

In the illustrative embodiment of the invention being detailed, the spray material is circulated continuously through the guns 33.

As they are commercially available, those made by the Nordson Corp. of Amherst, Ohio, for example, the guns 33 are not detailed, but in FIGURE 7, their essential features are schematically illustrated. Each gun 33 has a discharge port 35 closed by a valve 36 yieldably held closed by a spring 37 but providing a chamber 38 having an inlet port 39 and an outlet port 40 that are interconnected when the valve 36 is in its closed position and a chamber 41 having an inlet port 42.

Supply and return conduits 43 and 44 are connected to the inlet and outlet ports 39 and 40, respectively. The supply and return conduits 43 and 44 are carried by the arms 32 and these are connected to the corresponding ports of a generally indicated swivel 45 supported by the head 31 with supply and return conduits thereto from a suitable source, not shown, being indicated at 46 and 47, respectively.

On the admission of air under sufficient pressure to raise the valve 35 against the action of the spring 37, the dye or other fluent will be delivered through the port 35 until the air pressure in the chamber 41 is relieved to enable the spring 37 to seat the valve 35.

In accordance with the invention, the shaft 13 has a series of vertical bores 48 with a series of vertically spaced pairs of arcuate slots 49 and 50, one pair in communication with each bore 48 at its upper end. The lower end of each bore 48 is in communication with the appropriate one of a series of conduits 51 extending through the hub 45 with each conduit 51 extending lengthwise of an arm 32 and in communication with the port 42 of the gun 33 carried thereby.

Each series of arcuate slots is encircled by an independently rotatable ring, the ring for the series of slots 49 being indicated generally at 52 and that for the series of slots 50 being indicated generally at 53. The ring 52 has an arm 54 having a pivotal connection 55, see FIGURE 5, with a push-pull rod 56 extending slidably through the housing end wall where it is provided with a knob 57. The ring 53 has, similarly, an arm 58 extending in a direction opposite to the arm 54 and connected to a push-pull rod 59 by a pivotal connection 60. The rod 59 extends slidably through the housing end wall and is provided with a knob 61.

As may be seen in FIGURES 5 and 7, the ring 52 has a first pair of diametrically opposed air inlets 62 and 63 and a second pair of diametrically opposed inlets 64 and 65 each spaced arcuately the same distance from the adjacent inlet of the first pair. The ring 53 has a pair of diametrically opposed inlets 66 and 67, and a pair of diametrically opposed exhausts 68 and 69, each spaced arcuately the same distance from the adjacent inlet. The inlets 62, 64, and 66 are connected by conduits 70, 71, and 72, respectively, to a common conduit 73 controlled by a valve 74 mounted on the housing end wall 17. The conduit 70 has a shutoff valve 75. Similarly, the inlets 63, 65, and 67 are connected by conduits 76, 77, and 78, respectively to a common conduit 79 having a control valve 80 mounted on the housing end wall 17. The conduit 76 has a shut-off valve 81. By these means not only may either inlet 62 or 63 be closed but also all of the inlets 62, 64, and 66 or all of the inlets 63, 65, and 67 may be shut off.

Each inlet of both rings carries a seal, one such seal being shown in FIGURE 6 and generally indicated at 82. Each seal 82 consists of a ferrule or sleeve 83, nylon ferrules having proved to be satisfactory. Each ferrule 83 is a close sliding fit in an inlet and is backed by a coiled compression spring 84 held in place by the nipple fitting 85 threaded into the inlet. Each ferrule 83 is thus yieldably urged outwardly into sealing contact with the shaft surface, the shaft-contacting end 83A of each ferrule being arcuate with respect to the shaft.

From the foregoing, it will be apparent that hides being conveyed along the conveyor 11 may be treated with a desired spray with the material being delivered periodically through each gun 33 for an interval depending on the r.p.m. of the shaft 13 and on the relative positions of the rings 52 and 53.

In this connection, it will be appreciated that there are many variables to be considered in the treatment with fluents such as dyes, lacquers, and the like of material on conveyors of which hides are but one example. Examples of such variables are conveyor speeds, size of the hides, and the nature of their treatment. It will be obvious that the fluent should be confined, for various reasons, to that portion of the conveyor, widthwise, that is covered by the hides.

If, for example, the hides are small and centrally of the conveyor, the spray need only be delivered through a relatively narrow central arc A, see FIGURE 8. Larger hides would require the fluid delivery through a wider arc B and the largest hides might require fluid delivery through an area within the arc C. Some hides, at least with some fluents, may require a double spray and in some cases, the spray may have to be confined to one-half the conveyor, the areas represented by the arcs D and E.

In accordance with the invention, spray is delivered when the air shaft 13 is turning and the fluent is delivered to each gun 33. Under these conditions, as the shaft turns the slots of each conduit 48 are brought successively into communication with the air inlets with air then being delivered to operate the gun 33 controlled by that conduit, the air delivery being continued for angular movement of the slots determined by the vertical relationship of the corresponding inlets of the rings 52 and 53.

Under conditions where the fluent is to be delivered through a gun 33 travelling through an arc A, both air inlets 64 and 66 and both air inlets 65 and 67 are vertically aligned. The arcuate extent of a gun's operation can be increased by turning the rings to move the inlets 64 and 66 away from each other so that air is delivered first into an upper slot 49 and then into a lower slot 50 with the increase depending on the extent of the overlap between them with like adjustments resulting between the air inlets 65 and 67. Should yet wider arcuate sprays be desired the air inlets 62 and 63 are brought into service by opening the control valves 75 and 81. It will be obvious that the spray zone can be shifted towards one side of the conveyor or the other by appropriate adjustment of one ring relative to the other. It will also be apparent that the spray operation can be confined either to the infeed or outfeed side of the apparatus by means of the valves 74 and 80. The exhausts 68 and 69 serve to relieve the valve chambers 41 ensuring the shutting off of the sprays at the desired point.

Apparatus in accordance with the invention is, accordingly, well adpated to meet a wide range of spray treatment requirements.

I claim:

1. In apparatus for applying a fluent to an object travelling on a conveyor, a support above the conveyor, a shaft member rotatably supported by said support and depending therefrom, a plurality of equally spaced, outwardly extending arms attached to the lower end of said shaft member, each arm provided with a discharge device and including a conduit for the fluent in communication therewith and a normally closed valve in control thereof of the type opened by air under pressure, said shaft member having a plurality of lengthwise passages one for each valve and an upper and a lower series of equally spaced ports opening through its periphery, one port of each series in communication with a respective one of said passages, a connection placing each passage in communication with an appropriate one of said valves for the delivery of operating air thereto, a source of air under pressure, upper and lower ring members rotatable on said shaft member, each ring member overlying and closing an appropriate one of said series of ports and including at least one port in communication with said source and disposed to coact successively with the ports of each passageway to effect communication therebetween as the shaft member turns, one of each two coacting ports being elongated transversely of the axis of said members, and means to turn one of the ring members relative to the other thereby to enable each passageway to receive air through angular motion of said shaft member in a range extending from the arcuate length of one elongated port to approximately the combined arcuate length of the upper and lower elongated ports of that passageway.

2. The apparatus of claim 1 and means to turn the other ring member.

3. The apparatus of claim 2 in which each ring member turning means is separate from the other.

4. The apparatus of claim 1 in which at least one of the ring members includes an exhaust port in communication with a passageway approximately at the end of the angular shaft motion during which air was delivered thereto.

5. The apparatus of claim 1 in which one of the ring members has a second port closely adjacent the first named port and a shut-off valve in control of the second valve.

6. The apparatus of claim 1 in which each ring member has a pair of diametrically opposed ports.

7. The apparatus of claim 6 and a separate conduit to each of the ports of each ring member and each conduit has a shut-off valve.

8. The apparatus of claim 1 in which the ports of the ring members are the elongated ports.

9. The apparatus of claim 6 in which one of the rings has exhaust ports, one for each of the pair of ports and located to be in communication with a passageway approximately at the end of the angular shaft motion during which air was delivered thereto.

References Cited

UNITED STATES PATENTS

| 2,397,482 | 4/1946 | Griffin | 118—323 |
| 3,034,475 | 5/1962 | Bowman | 118—8 X |

M. HENSON WOOD, JR., *Primary Examiner.*

H. NATTER, *Assistant Examiner.*

U.S. Cl. X.R.

239—67, 97, 99, 225, 443; 118—323; 137—624.18